D. BERGER.
LOCK FOR USE IN AUTOMOBILES.
APPLICATION FILED MAY 12, 1915.

1,216,054.

Patented Feb. 13, 1917.

Witnesses
Benjamin Finckel

Inventor
Dellno Berger
By
Finckel & Finckel
his Attorneys

UNITED STATES PATENT OFFICE.

DELLNO BERGER, OF MADISON TOWNSHIP, FRANKLIN COUNTY, OHIO.

LOCK FOR USE IN AUTOMOBILES.

1,216,054.  Specification of Letters Patent.  Patented Feb. 13, 1917.

Application filed May 12, 1915. Serial No. 27,684.

*To all whom it may concern:*

Be it known that I, DELLNO BERGER, a citizen of the United States, residing in Madison township in the county of Franklin and State of Ohio, have invented a certain new and useful Improvement in Locks for Use in Automobiles, of which the following is a specification.

The object of this invention is to provide an improved lock for a robe, garment or other article, especially such as is left in an automobile while the owner or operator leaves the vehicle standing and unoccupied upon the street or road and to prevent the loss by theft or otherwise of such article.

The invention is embodied in the construction herein shown and described and then pointed out in the claims.

In the accompanying drawing—

Figure 1:
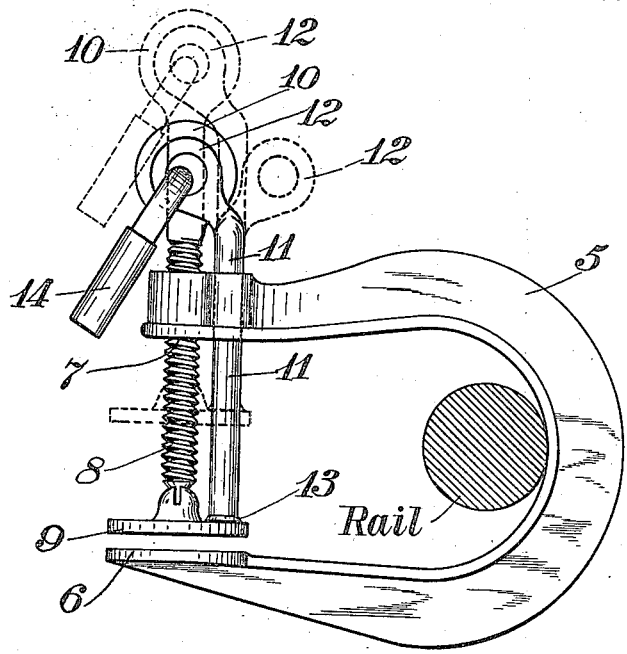
Figure 1 is a side view showing in full the device with the parts locked in position and in broken lines the parts unlocked.
Figure 2:
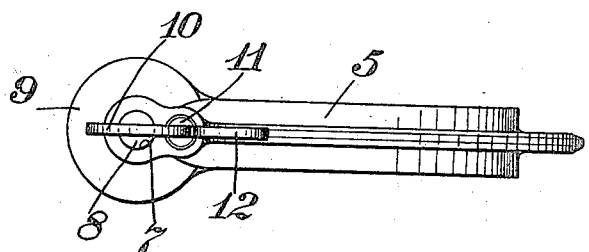
Fig. 2 is a top view showing the parts in unlocked position.

In the views 5 designates the frame which, in the instance shown, is generally of horseshoe form. One leg of the frame is made with a bearing or clamping member 6 while the other leg is threaded at 7 to receive a threaded shank 8 having at one end a clamping member or head 9 and at the other end an eye 10. The threaded leg of the frame is also provided with a smooth hole near and parallel to the threaded hole through which is passed a rod 11 having at its upper end an eye 12 and at its lower end an enlarged portion 13 to prevent the accidental removal and loss of the rod. In effect the rod 11 is swiveled to the frame. The eyes 10 and 12 are so formed that the eye 12 can be turned into coincidence with the eye 10 and through the two passed the hasp of a suitable pad lock as seen at 14.

The clamping member 9 can be raised or lowered according to the thickness of the object to be clamped and held and the rod 11 correspondingly raised or lowered so as to be brought into coupling relation with the eye of the threaded member carrying the clamping member 9. In practice the frame is connected with the robe rail or other permanent part of the automobile.

The device has uses or applications other than those specifically mentioned. It can, for example, be used to inclose and lock the spark lever and fuel lever of an automobile and so prevent the theft or unauthorized use or conversion of the automobile itself and indeed it can be used to lock both a robe or coat and the automobile at the same time. When the fabric is clamped with the device it cannot be quickly removed except by such a destruction of the article as will render it unfit for sale or use by the taker.

The forms of the parts can be modified without departing from the gist of the invention as claimed.

What I claim is:

1. In a lock, the combination, of a frame having a clamping member, a threaded shank adjustable axially in said frame and having a clamping member to coöperate with the first mentioned clamping member, and a rod engaging said frame and sliding thereon in a direction parallel to the axis of the screw, said threaded shank and sliding member constructed to receive means for locking them together and thereby prevent the rotation of the threaded shank.

2. In a lock, the combination of a frame having a clamping member, a movable coöperating clamping member including a shank threaded into and adjustable axially in the frame and a member slidingly engaging the frame, said threaded member and sliding member each provided with an eye to receive means for locking the threaded and sliding members together and thereby prevent the turning of the threaded member.

3. In a lock, the combination of a frame having a clamping member, a movable coöperating clamping member including a shank threaded into and adjustable axially in the frame, and a member slidingly and rotatably engaging the frame, said threaded and sliding members each having an eye to receive means for locking them together and thereby prevent the turning of the threaded member.

DELLNO BERGER.

Copies of this patent may be obtained for five cents each, by addressing the "Commissioner of Patents, Washington, D. C."